United States Patent [19]
Ishii et al.

[11] Patent Number: 4,952,011
[45] Date of Patent: Aug. 28, 1990

[54] MOVING APPARATUS FOR OPTICAL SYSTEMS

[75] Inventors: Hiroshi Ishii, Kashihara; Tetuyuki Ueda; Hiroyuki Sawai, both of Nara, all of Japan

[73] Assignee: Sharp Kabushiki Kaisha, Osaka, Japan

[21] Appl. No.: 288,440

[22] Filed: Dec. 22, 1988

[30] Foreign Application Priority Data

Dec. 25, 1987 [JP] Japan ................................ 62-332634

[51] Int. Cl.⁵ ............................................. G02B 26/10
[52] U.S. Cl. ..................................... 350/6.5; 350/637; 355/61
[58] Field of Search ................ 350/6.8, 612, 631, 637, 350/6.5, 486; 355/8, 55, 60, 61; 310/146, 14, 15, 19, 30; 356/376; 250/560

[56] References Cited

U.S. PATENT DOCUMENTS

| | | | |
|---|---|---|---|
| 4,355,883 | 10/1982 | Landa | 355/60 |
| 4,494,866 | 1/1985 | Rattin et al. | 355/60 |
| 4,585,331 | 4/1986 | Stoffel et al. | 355/8 |
| 4,634,267 | 6/1987 | Jones et al. | 355/55 |

FOREIGN PATENT DOCUMENTS

| | | |
|---|---|---|
| 56-87065 | 7/1981 | Japan . |
| 60-136730 | 7/1985 | Japan . |
| 60-136731 | 7/1985 | Japan . |
| 61-239236 | 10/1986 | Japan . |

*Primary Examiner*—Bruce Y. Arnold
*Assistant Examiner*—Loha Ben

[57] ABSTRACT

A moving apparatus for an optical system is a duplicating machine is arranged as to effect a scanning operation of document images through the movement of two units of mirror platforms respectively. One of the platform moves at a scanning speed while the other platform moves at one half scanning speed. A stator for a polyphase brushless motor is provided along the moving direction of the apparatus on both the side portions of the moving region of each mirror platform. Two sets of rotors of core-less coils operatively react with the stator to form polyphase brushless linear motors. The mirror platforms are driven by the motors at their center of gravity.

11 Claims, 6 Drawing Sheets first mirror
platform 1 second mirror
platform 2

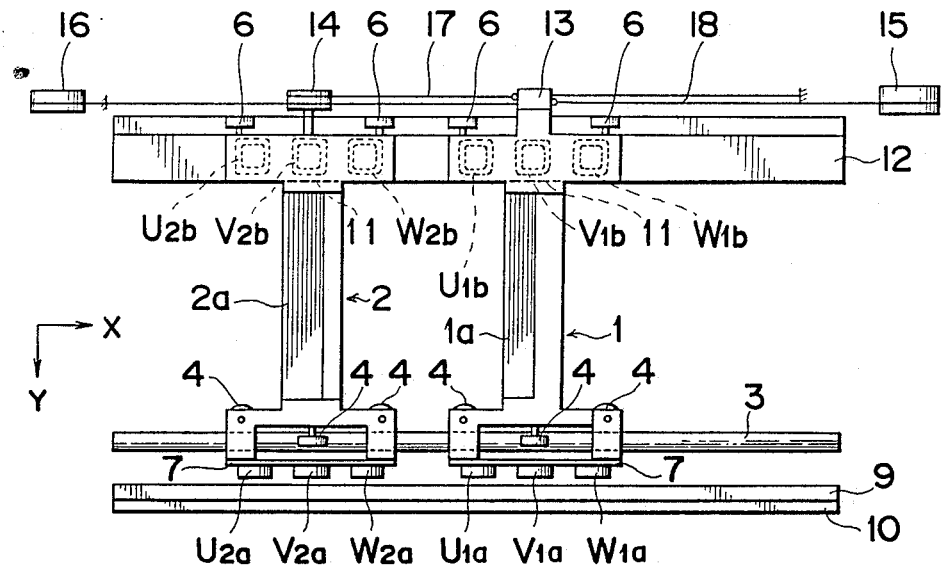
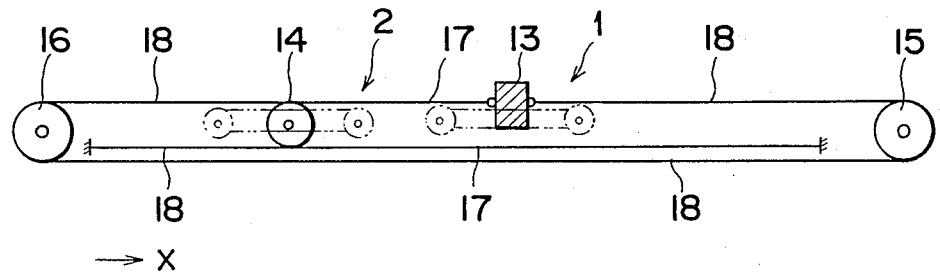
Fig. 9

MOVING APPARATUS FOR OPTICAL SYSTEMS

BACKGROUND OF THE INVENTION

The present invention generally relates to a moving apparatus for driving an optical system in a duplicating machine with the aid of a linear motor.

Recent duplicating machines often move the optical system, instead of moving a document platform, so as to scan the images on a document. A mechanical transmission gear such as wire, pulley or the like is required to convert the revolving power of the motor into rectilinear movements for transmitting the power into an optical system when such optical system movement is effected by the use of a rotary motor. However, it is difficult for a transmission apparatus such as wire, pulley or the like to move the optical system with high accuracy and speed, because an elastic member is used.

An optical moving apparatus for a duplicating machine using a linear motor, which does not require such a transmission apparatus as described, is known.

As disclosed in Japanese Patent Publication (unexamined) Tokkaisho No. 60-136731 there is provided as an arrangement for using a linear pulse motor (LPM) in a linear motor. A stator with uneven-shaped teeth being provided on the top face of a long yoke plate is mounted on the side of the main body of a duplicating machine along the moving direction, so that a rotor supporting an optical system is shaped to linearly move on it. The rotor has a coil-wound -shaped yoke mounted on both the NS polarity ends of a permanent magnet, and has the uneven-shaped teeth on both magnetic poles of each yoke, with the teeth being disposed opposite to the teeth on the side of the stator. Accordingly, a pulse current properly flows to each coil to sequentially generate such magnetic force as absorb the forward teeth on the side of the stator for driving the rotor.

Also, an invention disclosed in Japanese Patent Publication (unexamined) Tokkaisho No. 56-87065 is provided as an arrangement for using a voice coil motor (VCM) in a linear motor. A stator has a long yoke rod mounted on the main body of the duplicating machine along the moving direction, with a long permanent magnet being mounted sideways of the yoke rod, so that a rotor for supporting the optical system is engaged into the yoke rod to be linearly slid. The rotor is provided with a coil slidably wound with respect to the yoke rod. A current for flowing in the coil of the rotor and a magnetic flux in the direction always normal to the moving direction of the rotor are adapted to be formed by the permanent magnet on the side of the stator. Accordingly, a DC current is flowed into the coil, so that the rotor is driven through an electromagnetic force received.

It is necessary for an optical system of a duplicating machine to keep the optical distance constant from the document surface to the exposure position of an exposure member regardless of the scanning position. Thus, the optical system is adapted to move a first mirror platform, which reflects the light from the document surface into the horizontal direction, together with a light source at a scanning speed, and to move a second mirror platform, which reverses the direction of the reflected light by the first mirror platform in the same direction at half of the scanning speed.

A conventional optical system moving apparatus is driven with a linear motor provided on the first mirror platform only. The second mirror platform is moved at half of the scanning speed upon coupling to the first mirror platform through a mechanical coupling apparatus such as a moving pulley or the like. Therefore, conventionally, the linear motor does not drive the optical system at its center of gravity, so that stable movement is not achieved.

When a linear pulse motor is used for the linear motor, a permanent magnet and a coil-wound yoke are placed on a rotor for supporting the optical system, thus resulting in heavier weight on the side of the rotor. The linear pulse motor becomes larger in coil inductance, because the coil is wound around the yoke. Besides, the linear pulse motor is larger in thrust ripple. In this case, the response speed becomes lower, which results in a problem that the moving controlling of higher speed and accuracy is hard to achieve.

When a voice coil motor is used for the linear motor, the magnetic flux to be formed in the entire sliding portion of the rotor is concentrated on both end portions of the yoke rod, so that it is necessary to the sectional area of the end yoke for forming a magnetic path larger. As the permanent magnets on the side of the stator magnetically attract the opposite yoke rods or the like in the entire long portions, the mechanical strength of the entire stator is required to be increased. With the above described structure, it is difficult to make the liner motor lighter in weight.

SUMMARY OF THE INVENTION

An object of the present invention is to provide an optical system moving apparatus for a duplicating machine, which is capable of stably moving an optical system. Two sets of rotors for the polyphase brushless linear motor may drive the respective gravity center positions through the support of both the end portions of two units of mirror platforms.

Another important object of the present invention is to provide an optical system moving apparatus for a duplicating machine, which is capable of increasing the response speed of the optical system movement and simplifying the control of the high speed and high accuracy, because the coil inductance may be made smaller because the rotor of the polyphase brushless linear motor has a core-less coil, and the permanent magnet and the coil-winding yoke are not required on the rotor.

Still another object of the present invention is to provide an optical system moving apparatus for a duplicating machine, which is capable of easily making the optical system moving apparatus smaller, because the yoke of large sectional area is not required as the permanent magnet for the polyphase brushless linear motor is dispersed in its magnetic path, and the force with which the permanent magnet magnetically attracts the yoke may be made smaller.

In order to accomplish the above described objects, and other objects, the embodiments of the present invention, there has an optical system moving apparatus for a duplicating machine, which is so arranged as to effect a scanning operation of the document images by moving two units of mirror platforms respectively. The mirror platforms are moved at a scanning speed and at a speed half the scanning speed. There are provided stators for a polyphase brushless linear motor along the moving direction on both the side portions of the moving region of each mirror platform, and two sets of rotors through a core-less coil of the polyphase brushless linear motor are disposed on these stators. Both the rotors of the respective sets being mounted on both the end portions of each mirror platform.

When the driving currents with respectively different values are supplied to two sets of rotors, the rotors of the respective sets may be moved respectively on the stators at the scanning speed in the same direction. Two units of mirror platforms with the respective sets of rotors mounted thereon, also move at the scanning speed and at half the scanning speed in the same direction. Light from the document surface is reflected in the horizontal direction by a mirror platform moving at the scanning speed, and then is reversed in direction by the mirror platform moving at a speed half the scanning speed, so that the optical path distance from the document surface to the exposure face of the exposure member may be kept normally constant independently of the scanning position.

The two mirror platforms are driven with both the end portions being respectively supported by two sets of rotors. The polyphase brushless linear motor may drive these two mirror platforms respectively at the gravity center positions.

As the rotor of the polyphase brushless linear motor is composed of a core-less coil, the less coil inductance will do. Furthermore, the permanent magnet and the yoke with coil to be wound around it are not required to be mounted on the rotor as in the conventional linear pulse motor. Thus, the response speed of the operation is made faster and the moving control of the higher speed and accuracy is made easier.

As the stator of the polyphase brushless linear motor does not require the yoke of large sectional area, because the N polarity and the S polarity of the permanent magnet are alternately disposed, with these magnetic paths being dispersed. As a yoke rod is not required in opposition to the permanent magnet of the stator, the excessive mechanical strength is not required because the permanent-magnet force for magnetically attracting the yoke of the other portion is smaller.

When the yoke of proper size is arranged to form the magnetic path on the side of the stator, the permanent magnet on the side of the stator may be added to the support portion of the mirror platform through the magnetic attraction of the yoke by the permanent magnet on the side of the stator. Therefore, a roller or the like for supporting the rotor is prevented from being played so as to stabilize the movement.

The thrust to be added to both the end portions of each mirror platform may be equalized when the coils of each phase in both the rotors of each set are connected in series with respect to each other.

When linear scales are intended to be detected respectively by the rotor on the side of the stator which has the linear scales provided in both the rotors of the respective sets, with the linear scale being provided along the longitudinal direction on one of the stators, the linear scales of two sets of rotors may be served.

When the other mirror platform is coupled by a mechanical coupling apparatus to the mirror platform moving at a scanning speed so that it may move at a speed half as fast as the scanning speed, the speed difference between them may be forced to be fixed at 1:2. Thus, the feedback controlling by the linear scale is to be effected only through the position detection of one of mirror platforms, thus simplifying the control system. In this case, in order not to apply an unnecessary force to the coupling apparatus, the ratio $F_2:F_1$ of the thrust of two sets of rotors is required to be set for conformity to $m_2:2m_1$, with the mass of the respective movable portions composed of the mirror platform and both the rotors being respectively $m_1$, $m_2$.

BRIEF DESCRIPTION OF THE DRAWINGS

These and other objects and features of the present invention will become clearer from the following description taken in conjunction with the preferred embodiments thereof with reference to the accompanying drawings, in which:

FIG. 1 is a plan view of an optical system moving apparatus;

FIG. 2 is a sectional front-face view taken along a line II—II of FIG. 1;

FIG. 3 is a side view of an optical system moving apparatus;

FIG. 4 is a front face view of a core-less coil in a rotor;

FIG. 5 is a partial back view of a permanent magnet in a stator;

FIG. 6 is a circuit diagram showing the connection of a core-less coil;

FIG. 7 is a block diagram of a driving control circuit in the optical system moving apparatus;

FIG. 8 through FIG. 10 show another embodiment of the present invention;

FIG. 8 is a plan view of an optical moving apparatus;

FIG. 9 is a sectional front-face view showing a coupling apparatus for a mirror platform; and FIG. 10 is a block diagram of a driving control circuit in the optical system moving apparatus.

DETAILED DESCRIPTION OF THE INVENTION

Figure 1:
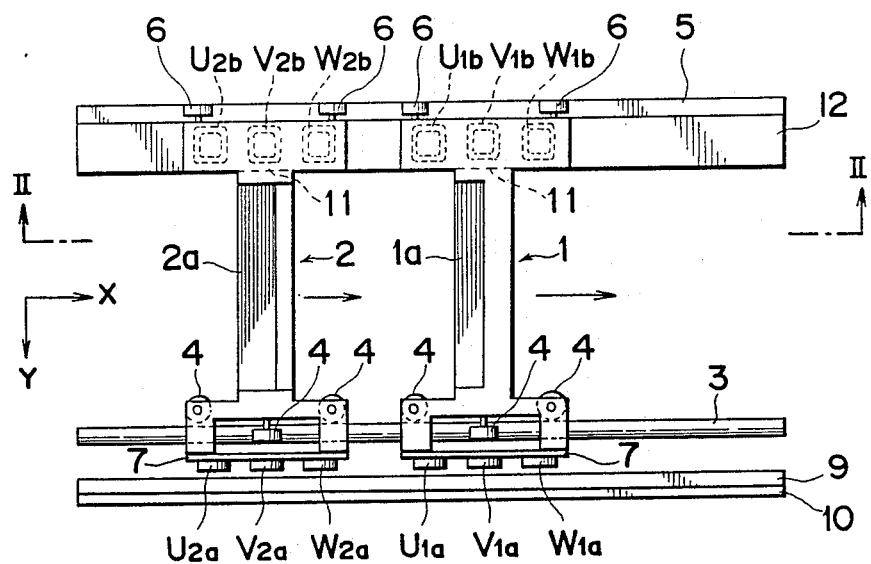
FIG. 1 through FIG. 7 show one embodiment of the present invention.
Figure 2:
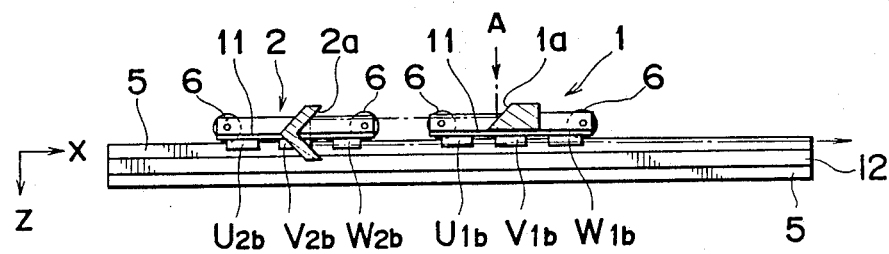
Figure 3:
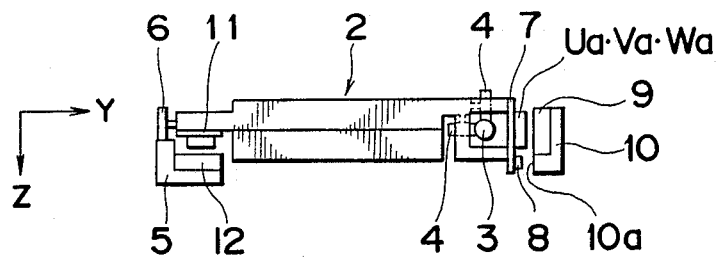

It is to be noted that like parts are designated by like reference numerals throughout the accompanying drawings.

Referring now to the drawings, there is shown in FIG. 1 through FIG. 7 an optical system moving apparatus according to one preferred embodiment of the present invention.

An optical system which is moved by the optical system moving apparatus includes a first mirror platform 1 and a second mirror platform 2. The first mirror platform 1 moves at a scanning speed in its scanning direction (X-direction in the drawing). Also, the second mirror platform 2 follows the first mirror platform 1 at a speed which is half the scanning speed in the scanning direction. An inclined mirror 1a is provided on the first mirror platform 1 to reflect light A from the document surface (not shown) into a direction opposite to the scanning direction a shown in FIG. 2. A right-angled mirror 2a is provided on the second mirror platform 2 so that the light A reflected by the mirror 1a is reflected once downwardly (in Z-direction), and furthermore, is reflected in the scanning direction. The light A reflected in the scanning direction is again reflected by a conventional fixed mirror and is applied onto the exposure portion of an exposure member (not shown). The inclined mirror 1a and the right-angled mirror 2a are formed along the scanning width direction (in Y-direction), thus allowing the duplicating operation to be performed on a document approximately as wide as the length of the document.

A long guide shaft 3 is disposed along the scanning direction (in the X-direction) on one end side (on the Y-direction side) of the first mirror platform 1 and the second mirror platform 2, and is secured on the duplicating-machine main body (not shown). Three rollers 4 which are rotatably disposed on the one end side of the first mirror platform 1 are disposed so that they may be rotated on the upper peripheral face and the lateral peripheral face of the guide shaft 3. Also, the three rollers 4 are rotatably disposed, likewise, even on one end side of the second mirror platform, so that they may be rotated on the upper peripheral face and the lateral peripheral face of the guide shaft 3. A long guide yoke 5 is disposed along the scanning direction on the other end side of the first mirror platform 1 and the second mirror platform 2, so that it may be secured to the duplicating-machine main body. Two rollers 6 disposed rotatably on the other end side of the first mirror platform 1 are disposed so that they may be rotated on the top face of the guide yoke 5. Also, two rollers 6 are rotatably provided similarly even on the side of the other end of the second mirror platform 2, so that they may be rotated on the top face of the guide yoke 5. Accordingly, first mirror platform 1 and the second mirror platform 2 may be reciprocated freely in the scanning direction under the control of the guide shaft 3 and the guide yoke 5.

In the present embodiment, a three-phase brushless linear motor is provided on the first mirror platform 1 and the second mirror platform 2, each being constructed as described hereinabove.

Figure 4:
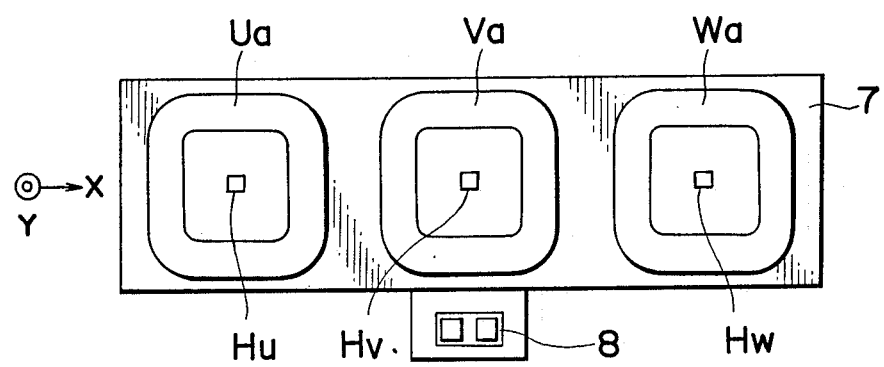

Each of the three-phase core-less coils $U_{1a}$, $V_{1a}$, $W_{1a}$ is secured respectively in the Y-direction through a yoke plate 7 onto the end face of one end side (the side of the Y-direction) of the first mirror platform 1. Also, each of the three-phase core-less coils $U_{2a}$, $V_{2a}$, $W_{2a}$ is secured respectively in the Y-direction through the yoke plate 7 even onto the end face on the one end side of the second mirror platform 2. These core-less coils $U_a$, $V_a$, $W_a$, which are the core-less coils of each phase in the three-phase brushless linear motor, are disposed side by side in the sequential order on the yoke plate 7 as shown in FIG. 4. Also, Hall elements $H_u$, $H_v$, $H_w$ are respectively disposed in the air-core central portions of the respective core-less coils $U_a$, $V_a$, $W_a$. The Hall elements $H_u$, $H_v$, $H_w$ are magnetic-field detecting elements for detecting the excitation change-over in the three-phase brushless linear motor. A detector 8 of a reflection type is provided on the bottom portion of the yoke plate 7.

Figure 5:
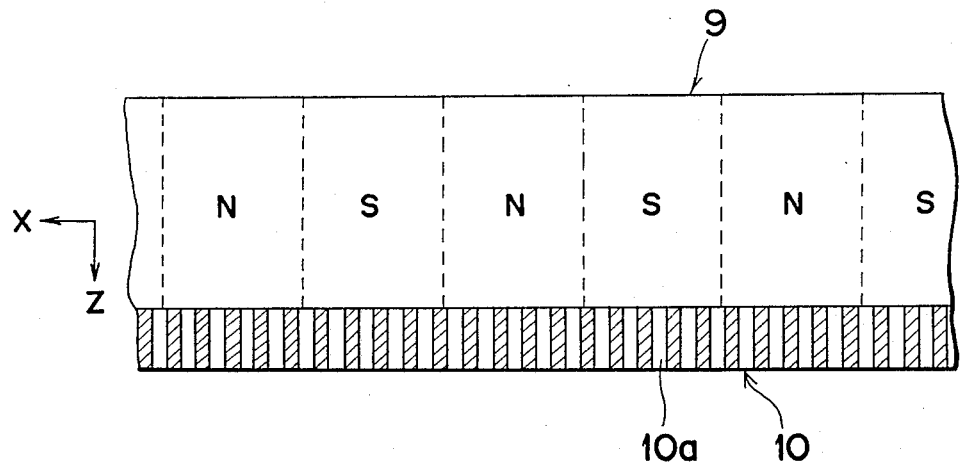
Figure 6:
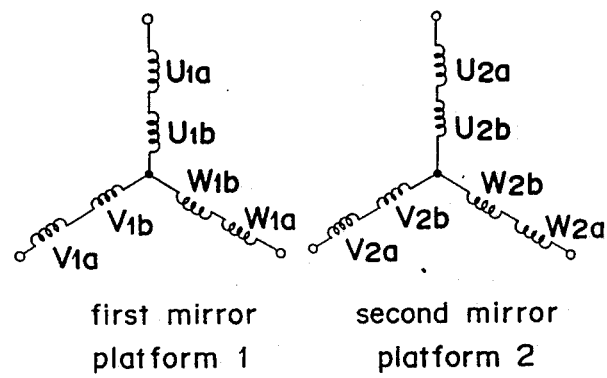

A permanent magnet 9 and a yoke 10 for retaining it to form a magnetic path are disposed sideways of another one end side of the first mirror platform 1 and the second mirror platform 2, as shown in FIG. 5, and are secured to the duplicating machine main body. The permanent magnet 9 is so arranged as to confront the respective core-less coils $U_a$, $V_a$, $W_a$ of the first mirror platform 1 and the second mirror platform 2, with a slight interval being provided with respect to the core-less coils. As shown in FIG. 5, the permanent magnet 9 is alternately magnetized, with the N polarity and the S polarity in the face opposite to the core-less coils $U_a$, $V_a$, $W_a$. The magnetized pitch is set to 3/5 times as big as the pitch among the respective core-less coils $U_a$, $V_a$, $W_a$ shown in FIG. 4. Also, a linear scale 10a with black and white patterns being repeatedly drawn thereon is formed on the side face of the yoke 10 located in the lower portion (in a Z-direction) of the magnetized face of the permanent magnet 9. The linear scale 10a is adapted to detect the position and speed of the first mirror platform 1 and the second mirror platform 2 by the photodetector 8. The linear scale 10a is used in common by the photodetectors 8, 8 in the first mirror platform 1 and the second mirror platform 2.

The respective three-phase core-less coils $U_{1b}$, $V_{1b}$, $W_{1b}$ are respectively secured downwardly (in the Z-direction) through the yoke plate 11 onto the side of the other end of the first mirror platform 1. Also, the respective three-phase core-less coils $U_{2b}$, $V_{2b}$, $W_{2b}$ are respectively secured downwardly through the yoke plate 11 even on the side of the other end of the second mirror platform 2. The core-less coils $U_b$, $V_b$, $W_b$ are core-less coils of each phase in the three-phase brushless linear motor, and are secured on the yoke plate 11 in the arrangement similar to that of the core-less coils $U_a$, $V_a$, $W_a$ shown in FIG. 4, with no Hall elements $H_u$, $H_v$, $H_w$ being provided. Also, no photo-detector is disposed on the side of the other end of the first mirror platform 1 and the second mirror platform 2.

A permanent magnet 12 to be retained by the guide yoke 5 is disposed downwardly of the other end sides of the first mirror platform 1 and the second mirror platform 2, and is secured onto the duplicating-machine main body. The permanent magnet 12 is so arranged as to confront the respective core-less coils $U_b$, $V_b$, $W_b$ of the first mirror platform 1 and the second mirror platform 2, with the slight interval with respect to the coils. The permanent magnet 12 is alternately magnetized to the N pole and the S pole as in the permanent magnet 9 as shown in FIG. 5 in the face opposite to the core-less coils $U_b$, $V_b$, $W_b$, with no linear scale being formed on the guide yoke 5.

Two pairs of the permanent magnet 9 and yoke 10, and the guide yoke 5 and permanent magnet 12 respectively constitute a stator of the three-phase brushless linear motor. Also, the core-less coils $U_{1a}$, $V_{1a}$, $W_{1a}$, and yoke plate 7, and the core-less coils $U_{1b}$, $V_{1b}$, $W_{1b}$, and yoke plate 11 in the first mirror platform 1, and the core-less coils $U_{2a}$, $V_{2a}$, $W_{2a}$, and yoke plate 7, and the core-less coils $U_{2b}$, $V_{2b}$, $W_{2b}$, and yoke plate 11 in the second mirror platform 2 respectively constitute the rotor of the three-phase brushless linear motor. The core-less coils $U_{1b}$, $V_{1b}$, $W_{1b}$ and the core-less coils $U_{2b}$, $V_{2b}$, $W_{2b}$ are equally arranged in the position of the X-direction as in the respective corresponding core-less coils $U_{1a}$, $V_{1a}$, $W_{1a}$ and the core-less coils $U_{2a}$, $V_{2a}$, $W_{2a}$. Also, the magnetized pitch and the magnetization polarity of the permanent magnet 12 are made equal in the X-direction arrangement as in those of the permanent magnet 9. The core-less coils $U_{1a}$, $V_{1a}$, $W_{1a}$, and the core-less coils $U_{1b}$, $V_{1b}$, $W_{1b}$ for constituting both the rotors of the first mirror platform 1 are intended to equalize the thrust by Y-connection of the three phase with connection in series for each phase. The same thing can be adapted, also, about the core-less coils $U_{2a}$, $V_{2a}$, $W_{2a}$ and the core-less coils $U_{2b}$, $V_{2b}$, $W_{2b}$ for constituting both the rotors of the second mirror platform 2. Accordingly, as the thrust at both the end portions becomes uniform, the first mirror platform 1 and the second mirror platform 2 may effect the stable movement.

The yoke plates 7, 7 for forming the magnetic paths of the core-less coils $U_a$, $V_a$, $W_a$ are absorbed in the Y-direction by the magnetic force of the permanent magnet 9. Also, the yoke plates 11, 11 for forming the magnetic paths of the core-less coils $U_b$, $V_b$, $W_b$ are sucked in the downward direction (in the Z-direction) by the magnetic force of the permanent magnet 12.

Thus, each roller 4 which rolls on the sideward peripheral face of the guide shaft 3 is previously pressed towards the Y-direction by the magnetic force. Also, the roller 6 is previously pressed downwardly by the self-weight on the side of the other ends of the first mirror platform 1 and the second mirror platform 2 and by the magnetic forces thereof. Accordingly, the play and so on to be caused by these rollers 4 and the roller 6 are prevented, thus allowing the first mirror platform 1 and the second mirror platform 2 to effect their smooth movements. As a small pressure force will do, the yoke plate 7 and the yoke plate 11 may be smaller and lighter, which does not increase the weight of the rotor considerably. Also, the core-less coils U, V, W are used, and the coil inductance becomes smaller. Accordingly, the rotor becomes better in response property.

Figure 7:
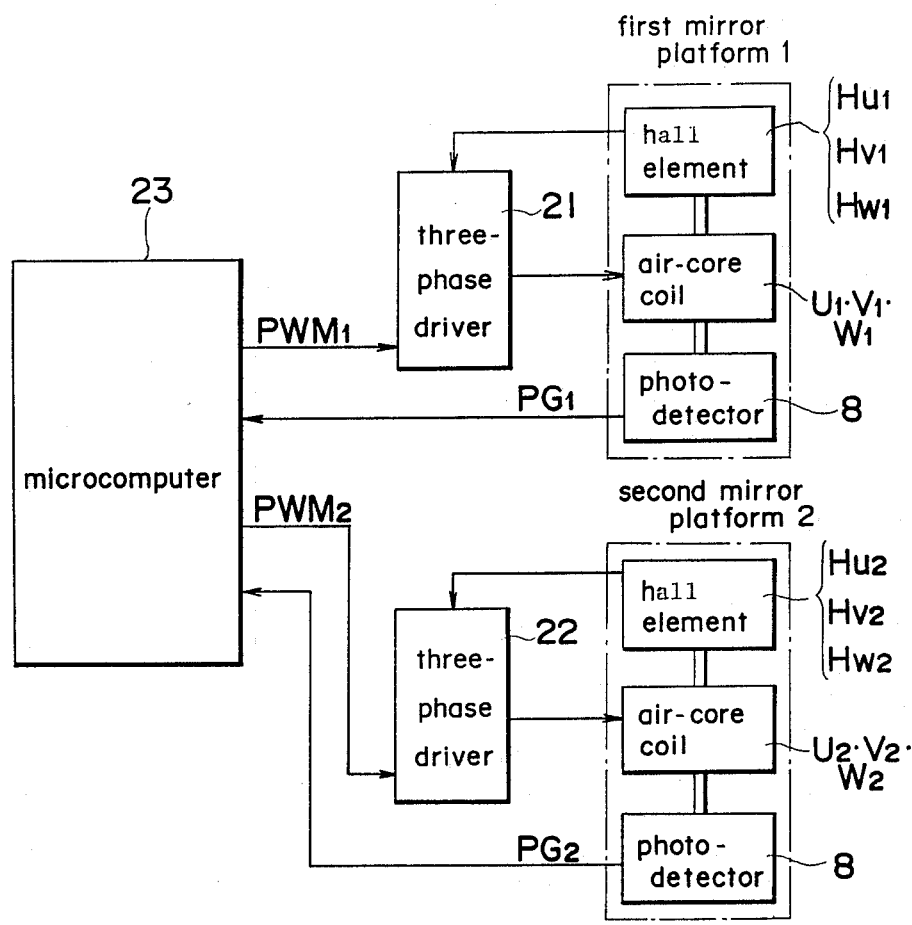

The optical system moving apparatus constructed as described hereinabove is driven by a driving control circuit shown in FIG. 7.

The outputs of the respective Hall elements $H_{u1}$, $H_{v1}$, $H_{w1}$ in the core-less coils $U_{1a}$, $V_{1a}$, $W_{1a}$ of the first mirror platform 1 are inputted into the first three-phase driver circuit 21. The three-phase driver circuit 21 switches the three-phase exciting current by a signal from the Hall elements $H_{u1}$, $H_{v1}$, $H_{w1}$ so as to respectively feed it into the core-less coils $U_1$, $V_1$, $W_1$ of both ends of the first mirror platform 1. Thus, the first mirror platform 1 is driven in the scanning direction (in the X-direction). Also, the microcomputer 23 feeds into the three-phase driver circuit 21 a speed signal $PWM_1$ corresponding to the scanning speed. In the three-phase driver circuit 21, the speed signal $PWM_1$ is inputted into a switching regulator so as to feed the exciting current corresponding to the duty ratio. Accordingly, the moving speed of the first mirror platform 1 is controlled by the speed signal $PWM_1$ into the scanning speed. The microcomputer 23 inputs the signal $PG_1$ coming from a photodetector 8 in the first mirror platform 1 so as to generate the speed signal $PWM_1$ by the PLL servo-control. Thus, the first mirror platform 1 may move stably and positively at a scanning speed.

The output of the respective Hall elements $H_{u2}$, $H_{v2}$, $H_{w2}$ in the core-less coils $U_{2a}$, $V_{2a}$, $W_{2a}$ of the second mirror platform 2 is inputted into the second three-phase driver circuit 22. The three-phase driver circuit 22 switches the three-phase exciting current by signals coming from the Hall elements $H_{u2}$, $H_{v2}$, $H_{w2}$ so as to respectively feed them to the core-less coils $U_2$, $V_2$, $W_2$ of both the ends of the second mirror platform 2. The second three-phase driver circuit 22 is composed of a circuit similar to the first three-phase driver circuit 21. Also, the microcomputer 23 feeds into the three-phase driver circuit 52 a speed signal $PWM_2$ corresponding to the speed half as fast as the scanning speed. The microcomputer 23 inputs a signal $PG_2$ coming from the photodetector 8 in the second mirror platform 2 so as to generate the speed signal $PWM_2$ by the PLL servo-control. Accordingly, the second mirror platform 2 may move stably and positively at a speed half as fast as the scanning speed.

In a case where the optical system has completed its scanning, the driving becomes reverse in its opposition by the driving control circuit, and the first mirror platform 1 and the second mirror platform 2 return to the given position.

As the first mirror platform 1 and the second mirror platform 2 obtain the thrust by the core-less coils $U_a$, $V_a$, $W_a$ and the core-less coils $U_b$, $V_b$, $W_b$ disposed on the side of both the ends, the center of gravity positions of the movable portions are respectively driven so as to prevent the unnecessary vibrations or the like which can result from the movement of the platforms.

Figure 10:
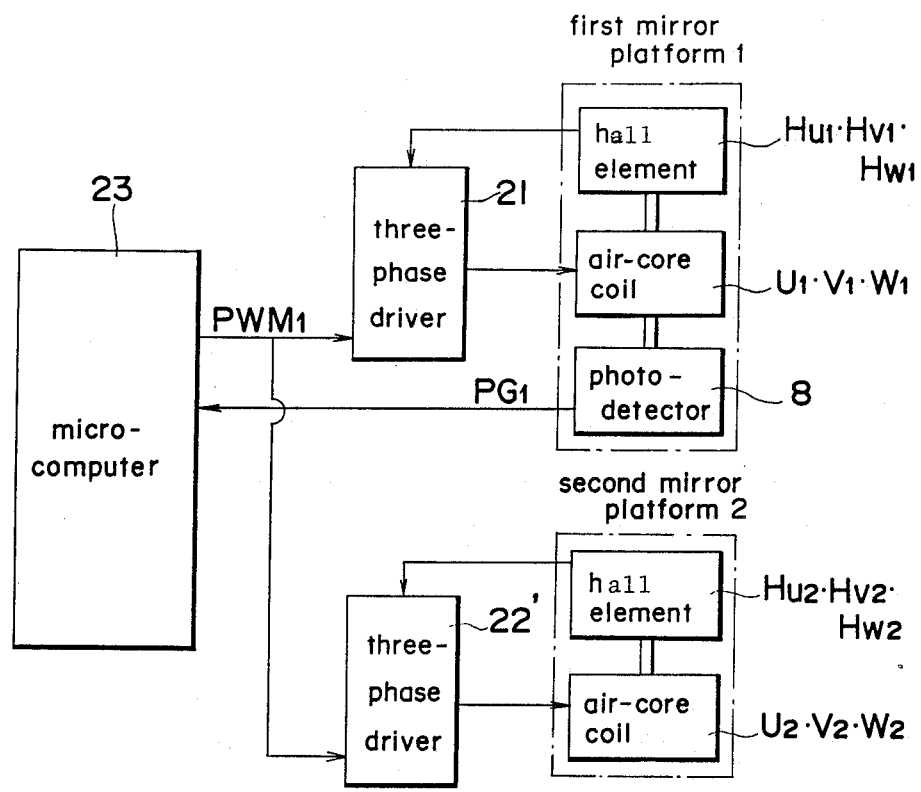

In FIG. 8 through FIG. 10 is illustrative of another embodiment of the present invention.

The photodetector 8 is provided, as shown similarly in embodiment 1, in the lower portion of the yoke plate 7 on the side of one end of the first mirror platform 1. However, no photodetector is provided in the lower portion of the yoke plate 7 on the side of one end of the second mirror platform 2. Accordingly, detection of the position and the speed by the linear scale 10a are effected only on the side of the first mirror platform 1.

As shown in FIG. 8, the other end side of the first mirror platform 1 is projected sideways of the other end side so as to form a wire mounting portion 13. A moving pulley 14 is rotatably mounted on the side of the end face on the other end side of the second mirror platform 2. In addition, fixed pulleys 15, 16 are respectively mounted rotatably on the duplicating-machine main body near both the ends of the scanning direction (in the X-direction) in the guide yoke 5 which is a stator on the side of the other end. One end of a first wire 17 and a second wire 18 are respectively secured to the wire mounting portion 13 of the first mirror platform 1. The moving pulley 14, the fixed pulleys 15, 16, the first wire 17 and the second wire 18 constitute a coupling apparatus for the first mirror platform 1 and the second mirror platform 2.

As shown in FIG. 9, the coupling apparatus is reversed in direction, with the first wire 17 being wound around the moving pulley 14, the first wire 17 being secured to one end onto a face facing the direction opposite to the scanning direction (in the X-direction) in the wire mounting portion 13, and is secured on its other end side to the duplicating-machine main body. When the first mirror platform 1 forming the wire mounting portion 13 moves at the scanning speed in its scanning direction, the second mirror platform 2 mounted with the moving pulley 14 is to be forced to move at a speed half as fast as the scanning speed in the same direction. Also, the second wire 18 with its one end being secured to a face directed at the scanning direction in the wire mounting portion 13 is wound around the fixed pulley 15 on the side of the scanning direction so as to be reversed in the direction, further is wound around the moving pulley 14 so as to be reversed again in the direction, with the other end side being secured to the duplicating-machine main body. When the first mirror platform 1 is moved in the direction opposite to the scanning direction, the second mirror platform 2 is to be forced to move in the same direction at a speed half as fast as the scanning speed. The assembling operation is effected, with a proper tension amount being given previously to the first wire 17 and the second wire 18 so as to prevent the deflection.

The optical system moving apparatus constructed as described hereinabove is driven by a driving control circuit shown in FIG. 10.

The outputs of the respective Hall elements $H_u$, $H_v$, $H_w$ in the core-less coils $U_a$, $V_a$, $W_a$ of the first mirror platform 1 and the second mirror platform 2 are respectively inputted into the first three-phase driver circuit 21 and the second three-phase driver circuit 22', and the exciting current to be fed to the core-less coils U, V, W is switched in a manner similar to that of the first embodiment. The speed signal $PWM_1$ common to the three-phase driver circuit 21 and the three-phase driver circuit 22' is fed from the microcomputer 23. The first three-phase driver circuit 21 receives the speed signal $PWM_1$ to drive the first mirror platform 1 at the scanning speed. However, the second three-phase driver circuit 22' receives the same speed signal $PWM_1$ so as to be driven at a speed half as fast as the scanning speed in the first three-phase driver circuit 21. Thus, the second mirror platform 2 is driven at a speed half as fast as the scanning speed. Accordingly, the speed of the first mirror platform 1 and the second mirror platform 2 results the same as that of the first embodiment. The microcomputer 23 inputs a signal $PG_1$ from the photodetector 8 in the first mirror platform 1 so as to generate the speed signal $PWM_1$ by the PLL servo-control. Accordingly, the first mirror platform 1 is capable of effecting the stable and positive movement at a scanning speed. Also, as the second mirror platform 2 is also coupled to the first mirror 1 by the coupling apparatus, it may be moved stably and positively at a speed half as fast as the scanning speed.

In the second embodiment as described above, as the first mirror platform 1 is coupled to the second mirror platform 2 by a coupling apparatus, a speed signal $PWM_1$ is generated only by a signal $PG_1$ from the photodetector 8 in the first mirror platform 1. As the speed signal $PWM_1$ may be used in common in the driving control of the first mirror platform 1 and the second mirror platform 2, the control system may be simplified.

The ratio $F_2:F_1$ of the thrust caused by the core-less coils $U_1$, $V_1$, $W_1$ and the core-less coils $U_2$, $V_2$, $W_2$ is required to be set to conform to $m_2:2m_1$, so that unnecessary force may not be applied upon the respective first wire 17 and the second wire 18 of the coupling apparatus which couples the first mirror platform 1 to the second mirror platform 2. Here, the masses including the rotor and so on of the first mirror platform 1 and the second mirror platform 2 are respectively assumed to be $m_1$, $m_2$. However, if the three-phase brushless linear motor to be used in the second embodiment is set to generate proper exciting current respectively in the first three-phase driver circuit 21 and the second three-phase driver circuit 22' in accordance with the speed signal $PWM_1$, with the thrust thereof being proportional to the exciting current, the ratio of the thrust may be easily provided. Accordingly, unrequired tension is added to the respective first wire 17 and second wire 18 of the coupling apparatus so as to prevent the excessive vibration from being caused in the movement of the first mirror platform 1 and the second mirror platform 2.

As is clear from the foregoing description, according to the optical system moving apparatus for the duplicating machine in accordance with the present invention, when the scanning operation of document images is effected by the movement of two mirror platforms at the respective scanning speeds and the speeds half as fast as the scanning speeds, the stator of a polyphase brushless linear motor is provided along the moving direction on both the side portions of the moving region of each mirror platform and two units of rotors by the core-less coil of the polyphase brushless linear motor are disposed on these stators, with the respective units of both the rotors being adapted on both the end portions of the respective mirror platforms.

The present invention has an effect in that the optical system may be stably moved, because two units of rotors for the polyphase brushless linear motor may drive the respective gravity-center positions through the support of both the end portions of two units of mirror platforms.

Also, as the rotor of the polyphase brushless linear motor uses the core-less coil, the coil inductance may be made smaller. In addition, the yoke is not required to mount a yoke on the rotor so as to wind the permanent magnet and coil. Thus, the present invention has a combined effect of quickening the response speed of the optical system movement and simplifying the control of the high speed and high accuracy.

As the permanent magnet for the polyphase brushless linear motor is dispersed in its magnetic path, the yoke of large sectional area is not required. Also, the force with which the permanent magnet magnetically attracts the yoke may be made smaller. Therefore, the present invention has an effect in that the optical system moving apparatus may be easily made smaller.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical system moving apparatus for a duplicating machine, wherein an optical system scans images by the movement of two mirror platforms, each having a mirror thereon, one platform moving at a scanning speed and the other platform moving at one-half the scanning speed, comprising:
   a stator for polyphase brushless motor located along a moving direction on both side portions of a moving region of each mirror;
   two sets of rotors operatively acting with the stator, to form polyphase brushless linear motors; and
   with the rotors of each set being mounted on opposite end portions of each mirror platform, whereby, when currents of respectively different values are applied to the two sets of rotors, the two mirror platforms will move in the same direction, one platform moving at the scanning speed, the other platform moving at one-half the scanning speed, and light from a document surface is reflected in a horizontal direction by the mirror platform moving at the scanning speed, and then is reversed in direction by the mirror platform moving at a speed one-half the scanning speed, so that an optical path distance from a document surface to an exposure face of an exposure member is kept normally constant independently of a scanning position.

2. The apparatus as defined in claim 1, further including means for driving the optical system moving apparatus at its center of gravity to provide stability of movement.

3. The apparatus as defined in claim 1, wherein each rotor includes a core-less coil.

4. The apparatus as defined in claim 3, wherein the rotors are mounted to the mirror platforms with yoke plates.

5. The apparatus as defined in claim 3, wherein the stator includes permanent N and S polarity magnets alternately disposed to each other.

6. The apparatus of claim 1, further including means for equalizing thrust to be added to both end portions of each mirror platform.

7. The apparatus of claim 6, wherein said means includes the connection of coils in the rotors of each set in series.

8. The apparatus of claim 6, wherein said stator includes means for detecting the position of the mirror platforms.

9. The apparatus of claim 8, wherein said means for detecting includes linear scales on said stators.

10. The apparatus of claim 1, wherein one of the mirror platforms is coupled by a mechanical coupling apparatus to the other mirror platform so that said one mirror platform will move at a speed which is half the speed of the other platform, the speed difference between the two platforms being fixed at 1:2.

11. An optical movement system for moving first and second optical elements at diverse translational speeds comprising:
- a first movable support for said first optical element;
- a second movable support for said second optical element;
- a first set of rotors fixed to said first movable support;
- a second set of rotors fixed to said second movable support;
- a stator operatively interacting with said first and second sets of rotors to form first and second polyphase motors;
- first drive means for driving said first movable support at a first speed; and
- a second drive means for driving said second movable support at a second speed.

* * * * *